Patented June 19, 1923.

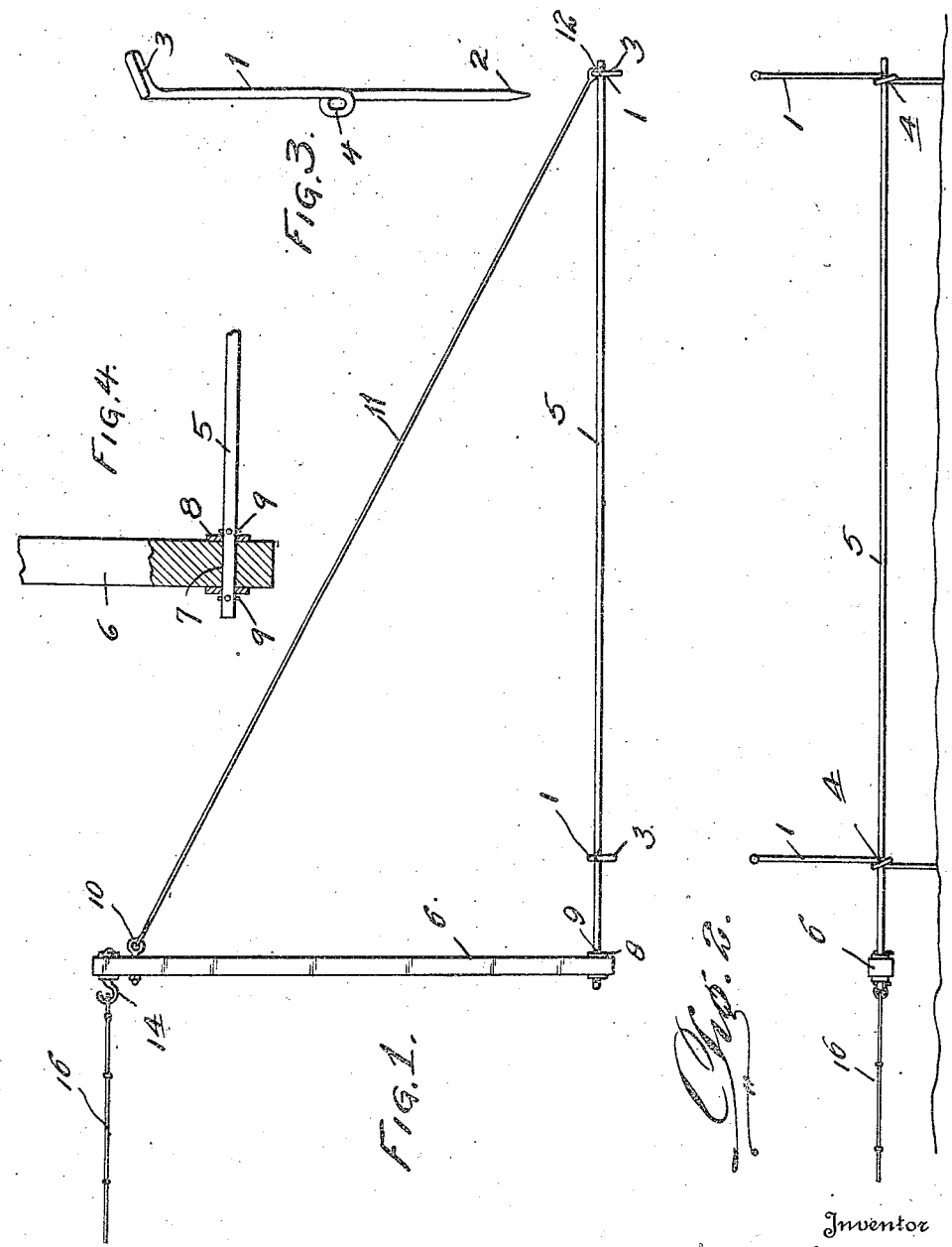

1,459,163

UNITED STATES PATENT OFFICE.

AUBREY M. SCHIEBERL, OF MOUNDVILLE, MISSOURI.

CHECKROW-WIRE SUPPORT.

Application filed June 20, 1922. Serial No. 569,669.

*To all whom it may concern:*

Be it known that I, AUBREY M. SCHIEBERL, a citizen of the United States, residing at Moundville, in the county of Vernon and State of Missouri, have invented new and useful Improvements in Checkrow-Wire Supports, of which the following is a specification.

In carrying out the present invention it is my purpose to provide a check row wire support whereby the wire for operating the planter may be properly anchored at both ends and whereby the wire may be automatically thrown by the planter from one position to the other, so that after the planter is operated to plant one row, it may be operated on its return to its initial starting position to plant a parallel row, the construction of my supporting means being such as to enable the wire to be thrown from one position to the other by the planter, when returning to its initial starting position.

A further object of my invention is to improve and simplify the general construction of check row wires and to provide a support which will operate efficiently and effectively under all conditions.

With the above recited objects in view, and others of a like nature, the invention resides in the construction, combination and arrangement of parts set forth in and falling within the scope of the appended claim.

In the accompanying drawings:

Figure 1 is a top plan view of my improved support.

Figure 2 is an edge elevation of the same.

Figure 3 is a perspective view of one of the anchor members.

Figure 4 is an enlarged fragmentary sectional view therethrough.

Referring now to the drawings in detail, 1—1 designate the anchor members, each comprising a single length of wire having one end sharpened to provide a penetrating point 2 adapted to penetrate the earth and the other end formed to provide a head 3. Centrally of its ends the wire is bent upon itself to provide a bearing loop 4. These anchor members are driven into the ground at each end of the field to be planted between two rows. After the members 1 are driven into the ground the loops 4 are placed in alinement with each other, as shown in Figure 2, and through these alining loops is passed a rod 5. Arranged at right angles to the rod 5 at one end thereof is a bar 6 formed with an opening 7 through which the adjacent end of the rod 5 passes, as clearly illustrated in Figure 5 of the drawings. On opposite sides of the bar 6 the rod 5 is equipped with washers 8, and passed through the rod 5 are cotter pins 9 that act to hold the rod 5 to the bar 6.

Connected to the bar 6 adjacent to the other end thereof is an eye bolt 10, and connected to the eye bolt 10 is one end of a guy wire 11, the other end of which is suitably secured to the end of the rod 5 remote from the bar 6, as clearly shown in Figure 1 of the drawings. Thus a substantial structure is provided. The bar 6 adjacent to the eye bolt 10 is formed with an opening 13, and secured within this opening 13 is a shank of a hook 14. My improved check row wire supports are arranged at the ends of the field and extending from one hook 14 to the other is a check wire 16 constructed as usual to operate the planting mechanism of the planter 17.

In practice, the bars 6 are arranged in the position of Figure 1, at opposite sides of the field, thereby arranging the wire 16 in a position so that one row may be planted. The planter is now drawn along the wire 16 and when the planter reaches the other check row wire support the planting mechanism is detached from the check wire, and the planter moved around the support to the other row, this support being then swung over to the other row to be planted. The planter is now moved along to plant the other row and travels toward the remote bar 6, the wire 16 assuming an angular position, between the supports and when the planter reaches that portion of the wire 16 which is under tension between the planter and the bar 6, then the bar and its accompanying parts are also swung from the full line position in Figure 6 to the dotted line position, thereby placing the balance of the check wire in proper position to operate the planter in its continued movement along the row being planted.

While I have herein shown and described one preferred form of my invention by way of illustration, I wish it to be understood that I do not limit or confine myself to the precise details of construction herein shown and described, as modifications and variations may be made within the scope of the claim and without departing from the spirit of my invention.

Having thus described the invention, what is claimed as new, is:—

In a support for check row wires comprising pairs of spaced anchor members at opposite ends of a field, a rod journaled within eyes formed in each pair of anchor members, a bar rigidly connected to one end of the rods and arranged at right angles thereto. hooks in the free ends of each bar adapted for securing a checking wire between said bars and a guy wire between the free ends of each bar and rod.

In testimony whereof I affix my signature.

AUBREY M. SCHIEBERL.